(12) United States Patent
Lampton

(10) Patent No.: US 10,969,033 B2
(45) Date of Patent: Apr. 6, 2021

(54) PROPORATIONAL FLOW CONTROL VALVE WITH AN INTEGRATED PRESSURE COMPENSATOR AND FEATURES FOR FLOW FORCE REDUCTION

(71) Applicant: Sun Hydraulics, LLC, Sarasota, FL (US)

(72) Inventor: Chad Lampton, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 106 days.

(21) Appl. No.: 16/537,802

(22) Filed: Aug. 12, 2019

(65) Prior Publication Data

US 2021/0048118 A1 Feb. 18, 2021

(51) Int. Cl.
*F16K 31/06* (2006.01)
*F15B 13/02* (2006.01)
*F16K 3/26* (2006.01)
*F15B 11/08* (2006.01)

(52) U.S. Cl.
CPC .......... *F16K 31/0686* (2013.01); *F15B 11/08* (2013.01); *F15B 13/026* (2013.01); *F16K 3/265* (2013.01); *F16K 31/0651* (2013.01); *F16K 31/0682* (2013.01)

(58) Field of Classification Search
CPC ............. F16K 31/0686; F16K 31/0682; F16K 31/0651; F16K 3/265; F15B 13/0418; F15B 13/0417; F15B 11/08; F15B 13/026
See application file for complete search history.

(56) References Cited

U.S. PATENT DOCUMENTS

| 5,617,895 A * | 4/1997 | Pfuhl et al. .......... | F15B 13/0402 |
| | | | 137/625.69 |
| 9,140,274 B2 * | 9/2015 | Liukkunen .............. | F15B 13/16 |
| 10,663,066 B2 * | 5/2020 | Lampton et al. ......... | F16K 1/46 |
| 2012/0199771 A1 * | 8/2012 | Kasagi et al. ...... | F16K 31/0613 |
| | | | 251/129.15 |

OTHER PUBLICATIONS

Bosch Rexroth AG, "Proporational Flow Control Valve with Integrated Pressure Compensator Type KUDSR", Catalogue Sheet, RE 18702, Dec. 2017, 12 pages.

* cited by examiner

*Primary Examiner* — Kevin L Lee
(74) *Attorney, Agent, or Firm* — McDonnell Boehnen Hulbert & Berghoff

(57) ABSTRACT

An example valve includes: a pressure compensation spool configured to be subjected to a first fluid force of fluid received at an inlet port of the valve; a sleeve having a cavity and at least one throttling cross-hole; a throttling spool disposed in the cavity of the sleeve and configured to be axially movable therein, wherein the throttling spool blocks the at least one throttling cross-hole when the valve is unactuated; and a pressure compensation chamber, wherein when the valve is actuated, the throttling spool moves in the proximal direction to form a throttling flow area between a distal end face of the throttling spool and an edge of the at least one throttling cross-hole, allowing fluid flow from the inlet port to the pressure compensation chamber, thereby causing a second fluid force to be applied on the pressure compensation spool, allowing flow to an outlet port of the valve.

20 Claims, 5 Drawing Sheets

PROPORTIONAL FLOW CONTROL VALVE WITH AN INTEGRATED PRESSURE COMPENSATOR AND FEATURES FOR FLOW FORCE REDUCTION

BACKGROUND

A hydraulic valve directs the flow of a liquid medium, usually oil, through a hydraulic system. The direction of the oil flow is determined by the position of a spool or a poppet. The size of the valve may be determined by the maximum flow of the hydraulic system through the valve and the maximum system pressure.

An example valve may have a movable element inside a housing or sleeve. For instance, the valve may include a spool that is movable by an actuation mechanism (e.g., electric, hydraulic, pneumatic, or manual). Once the valve is actuated, the spool moves to allow fluid flow from a first port to a second port.

In example valves, fluid flow can cause flow forces to oppose the actuation force applied to the spool. As a consequence, the valve might not operate as expected or a large actuation force (e.g., a larger solenoid coil that can achieve a higher solenoid force) is used to make up for such opposing flow forces.

Therefore, it may be desirable to have a valve that reduces the flow forces so as to reduce the required actuation force, thereby reducing the cost of the valve. It is with respect to these and other considerations that the disclosure made herein is presented.

SUMMARY

The present disclosure describes implementations that relate to a proportional flow control valve with integrated pressure compensator and features for flow force reduction.

In a first example implementation, the present disclosure describes a valve. The valve includes: (i) a pressure compensation spool configured to be subjected to a first fluid force of fluid received at an inlet port of the valve acting on the pressure compensation spool in a proximal direction to move the pressure compensation spool in the proximal direction and allow fluid to flow from the inlet port to a bypass port of the valve; (ii) a sleeve disposed partially within the pressure compensation spool, wherein the sleeve has a cavity therein and has at least one throttling cross-hole; (iii) a throttling spool disposed in the cavity of the sleeve and configured to be axially movable therein, wherein the throttling spool blocks the at least one throttling cross-hole when the valve is unactuated; and (iv) a pressure compensation chamber. When the valve is actuated, the throttling spool moves in the proximal direction to form a throttling flow area between a distal end face of the throttling spool and an edge of the at least one throttling cross-hole, allowing fluid flow from the inlet port to the pressure compensation chamber through the throttling flow area, thereby causing a second fluid force to be applied on the pressure compensation spool in a distal direction by fluid in the pressure compensation chamber, such that the pressure compensation spool moves in the distal direction to form a pressure compensation flow area that allows fluid flow therethrough from the pressure compensation chamber to a priority port of the valve, thereby allowing fluid received at the inlet port to be apportioned between the bypass port and the priority port.

In a second example implementation, the present disclosure describes a hydraulic system including a source of fluid; a first hydraulic consumer; a second hydraulic consumer; and a valve comprising: (i) an inlet port fluidly coupled to the source of fluid, (ii) a priority port fluidly coupled to the first hydraulic consumer, and (iii) a bypass port fluidly coupled to the second hydraulic consumer. The valve further comprises: (i) a pressure compensation spool configured to be subjected to a first fluid force of fluid received at the inlet port acting on the pressure compensation spool in a proximal direction to move the pressure compensation spool in the proximal direction and allow fluid to flow from the inlet port to the bypass port; (ii) a sleeve disposed partially within the pressure compensation spool, wherein the sleeve has a cavity therein and has at least one throttling cross-hole; (iii) a throttling spool disposed in the cavity of the sleeve and configured to be axially movable therein, wherein the throttling spool blocks the at least one throttling cross-hole when the valve is unactuated; and (iv) a pressure compensation chamber. When the valve is actuated, the throttling spool moves in the proximal direction to form a throttling flow area between a distal end face of the throttling spool and an edge of the at least one throttling cross-hole, allowing fluid flow from the inlet port to the pressure compensation chamber through the throttling flow area, thereby causing a second fluid force to be applied on the pressure compensation spool in a distal direction by fluid in the pressure compensation chamber, such that the pressure compensation spool moves in the distal direction to form a pressure compensation flow area that allows fluid flow therethrough from pressure compensation chamber to the priority port of the valve, thereby allowing fluid received at the inlet port to be apportioned between the first hydraulic consumer and the second hydraulic consumer.

In a third example implementation, the present disclosure describes a valve. The valve includes: (i) an outer sleeve having a first cavity therein; (ii) a pressure compensation spool disposed in the first cavity of the outer sleeve and configured to be axially movable therein, wherein the pressure compensation spool is configured to be subjected to a first fluid force of fluid received at an inlet port of the valve acting on the pressure compensation spool in a proximal direction; (iii) an inner sleeve disposed partially within the pressure compensation spool, wherein the inner sleeve has a second cavity therein and has at least one throttling cross-hole; (iv) a throttling spool disposed in the second cavity of the inner sleeve and configured to be axially movable therein, wherein the throttling spool blocks the at least one throttling cross-hole when the valve is unactuated; and (v) a pressure compensation chamber formed between the inner sleeve and the outer sleeve, wherein when the valve is actuated, the throttling spool moves in the proximal direction to form a throttling flow area between a distal end face of the throttling spool and an edge of the at least one throttling cross-hole, allowing fluid flow from the inlet port to the pressure compensation chamber through the throttling flow area, thereby causing a second fluid force to be applied on the pressure compensation spool in a distal direction by fluid in the pressure compensation chamber, such that the pressure compensation spool moves in the distal direction to form a pressure compensation flow area that allows fluid flow therethrough from the pressure compensation chamber to an outlet port of the valve, thereby allowing fluid received at the inlet port to flow to the outlet port.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

In examples, a normally-closed valve can have a throttling spool that blocks a throttling flow opening to preclude fluid flow from a first port to a second port. The valve can have an actuation mechanism such as a solenoid actuator, and when a solenoid coil of the solenoid actuator is energized, a solenoid force is generated and applied to the throttling spool. In response, the throttling spool can move, thereby gradually exposing the throttling flow opening and allow fluid flow from the first port to the second port.

In an example, the valve can be configured as a pressure compensating valve and can include another spool that moves within the valve to change the size of a pressure compensation opening to maintain a constant pressure drop across the throttling flow opening. In conventional valves, fluid can flow through an inside chamber of the throttling spool, then through cross-holes disposed in the throttling spool. The throttling flow opening is formed between such cross-holes and respective cross-holes of a sleeve in which the throttling spool moves. Thus, fluid flows through the cross-holes of the throttling spool before flowing to the pressure compensation opening.

In such conventional valve configurations, a large Bernoulli flow force can result from accelerating fluid mass through the cross-holes of the throttling spool. The flow force can have an axial or longitudinal component that acts on the throttling spool in a closing direction, opposing the solenoid force. As an example for illustration, the flow force can have a magnitude of 5 pound-force (lbs). In this example, a large solenoid coil is used to generate a large solenoid force (e.g., 30 lbs) that can overcome the flow force and allow for proportionality of flow as an electric command to the solenoid coil is changed. Such a solenoid coil can be expensive and bulky.

It may thus be desirable to reduce the flow force so as to enable the valve to operate with a smaller solenoid force and a smaller solenoid coil compared to conventional valves. Disclosed herein is an electro-hydraulic proportional flow control valve with integrated pressure compensation and flow force reduction features.

Figure 1:
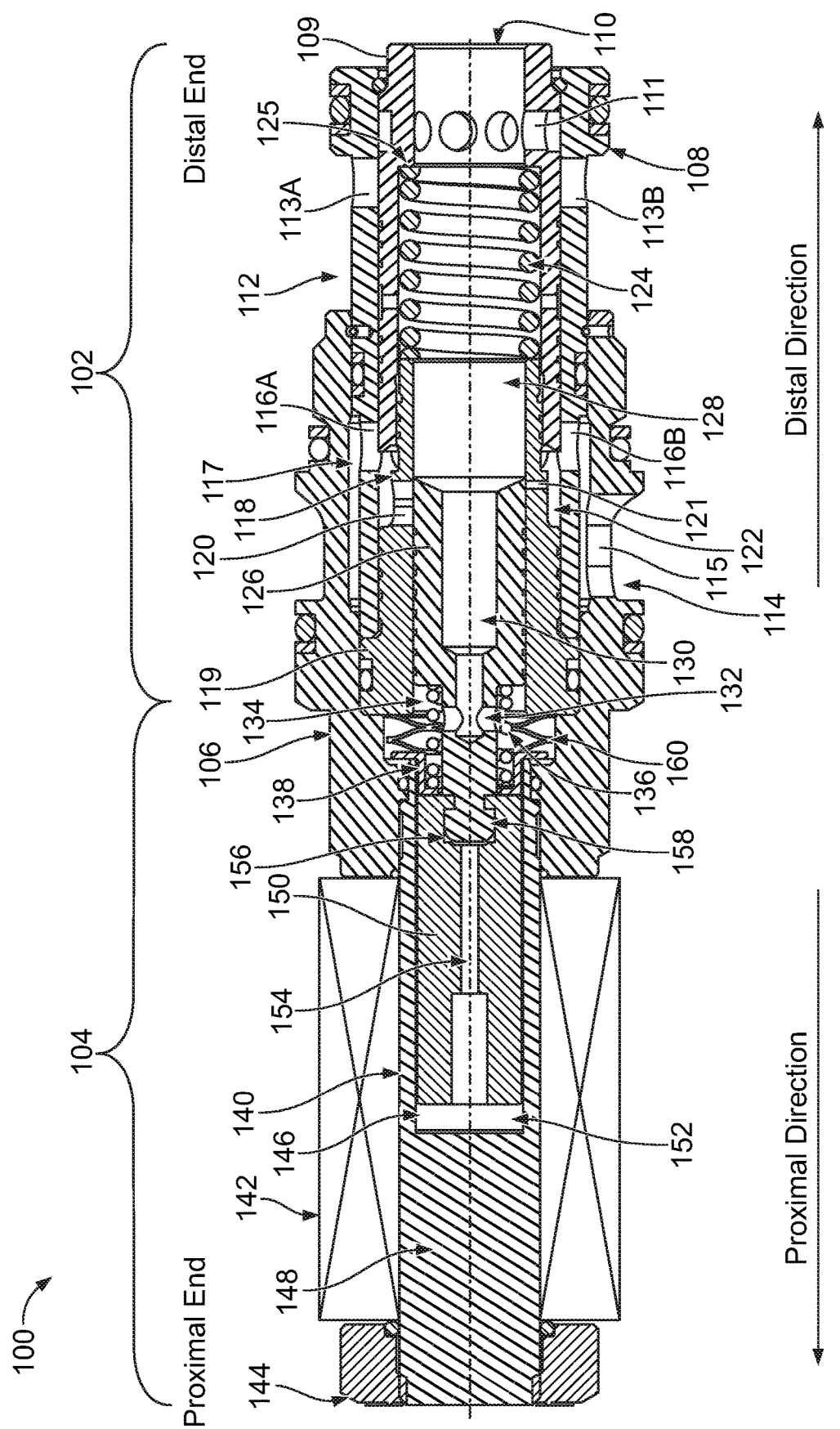
FIG. 1 illustrates a cross-sectional side view of a valve, in accordance with an example implementation.

FIG. 1 illustrates a cross-sectional side view of a valve 100, in accordance with an example implementation. The valve 100 may be inserted or screwed into a manifold having ports corresponding to ports of the valve 100 described below, and can thus fluidly coupled the valve 100 to other components of a hydraulic system.

The valve 100 includes a pressure-compensated flow control portion 102 and a solenoid actuator 104. The valve 100 includes a housing 106 having a longitudinal cylindrical cavity therein. The longitudinal cylindrical cavity of the housing 106 is configured to house parts of the pressure-compensated flow control portion 102 and the solenoid actuator 104.

The valve 100 includes a main or outer sleeve 108 fixedly disposed at a distal end of the housing 106 within the longitudinal cylindrical cavity thereof. The outer sleeve 108 has a respective longitudinal cylindrical cavity therein.

The valve 100 also includes a pressure compensation spool 109 disposed within the respective longitudinal cylindrical cavity of the outer sleeve 108. The pressure compensation spool 109 can also be referred to as a pressure compensation piston. The pressure compensation spool 109 is slidably accommodated within the outer sleeve 108 and is axially movable therein. The term "slidably accommodated" is used throughout herein to indicate that a first component (e.g., the pressure compensation spool 109) is positioned relative to a second component (e.g., the outer sleeve 108) with sufficient clearance therebetween, enabling movement of the first component relative to the second component in the proximal and distal directions. As such, the first component (e.g., the pressure compensation spool 109) is not stationary, locked, or fixedly disposed in the valve 100, but rather, is allowed to move relative to the second component (e.g., the outer sleeve 108).

The valve 100 includes an inlet port 110 at a nose or distal end of the pressure compensation spool 109 and the outer sleeve 108. The inlet port 110 is configured to be fluidly coupled to a source of fluid (e.g., a pump, an accumulator, etc.) capable of providing fluid at high pressure levels (e.g., 1000-5000 pounds per square inch (psi)). The pressure compensation spool 109 further includes a set of cross-holes, such as cross-hole 111, disposed in a radial or circumferential array about the pressure compensation spool 109.

The valve 100 also includes a bypass port 112. The bypass port 112 can be configured to be fluidly coupled to a tank or reservoir of hydraulic fluid having fluid at a low pressure level, e.g., 0-70 psi, or to a secondary hydraulic circuit or component. The bypass port 112 can include a set of bypass flow cross-holes, such as bypass flow cross-holes 113A, 113B, disposed in radial or circumferential array about the outer sleeve 108. The term "hole" is used generally herein to indicate a hollow place (e.g., cavity) in a solid body or surface, for example. The term "cross-hole" indicates a hole that crosses a path of, or is formed transverse relative to, another hole, cavity, or channel.

The valve 100 further includes a priority port 114. The priority port 114 can include one or more priority flow cross-holes, such as a priority flow cross-hole 115 disposed in the housing 106. The priority flow cross-hole 115 is configured to be fluidly coupled to a primary or priority hydraulic circuit or component (e.g., a hydraulic actuator) to provide pressure-compensated metered flow thereto as described below with respect to FIG. 3.

The outer sleeve 108 includes another set of cross-holes disposed in a radial or circumferential array about the outer sleeve 108 and can be referred to as pressure compensation cross-holes, such as pressure compensation cross-holes 116A, 116B. The pressure compensation cross-holes 116A, 116B are fluidly coupled to an annular chamber 117 formed between an exterior peripheral surface of the outer sleeve 108 and an interior peripheral surface of the housing 106. The annular chamber 117 is fluidly coupled to the priority flow cross-hole 115 and the priority port 114. With this configuration, the pressure compensation cross-holes 116A, 116B are fluidly coupled to the priority flow cross-hole 115 and the priority port 114 by way of the annular chamber 117.

As depicted in FIG. 1, the pressure compensation spool 109 is hollow and includes a longitudinal cylindrical cavity therein. The valve 100 includes a secondary or inner sleeve 118 that is disposed partially within the pressure compensation spool 109. The inner sleeve 118 is restrained from moving by having a shoulder or protrusion 119 secured between a proximal end of the outer sleeve 108 and a shoulder formed in the interior surface of the housing 106.

The inner sleeve 118 includes a set of metering or throttling cross-holes, such as throttling cross-hole 120, disposed in a radial or circumferential array about the inner sleeve 118. The inner sleeve 118 further includes damping orifices, such as damping orifice 121, disposed in a respective radial array interposed between the throttling cross-holes of the inner sleeve 118. The throttling cross-hole 120 is fluidly coupled to a pressure compensation chamber 122 formed between an exterior peripheral surface of the inner sleeve 118 and an interior peripheral surface of the outer sleeve 108. With this configuration, the throttling cross-hole 120 can be fluidly coupled to the pressure compensation cross-holes 116A, 116B by way of the pressure compensation chamber 122.

The valve 100 further includes a pressure compensation spring 124 disposed within the pressure compensation spool 109. Particularly, a distal end of the pressure compensation spring 124 rests against a shoulder 125 formed by an interior surface of the pressure compensation spool 109, whereas a proximal end of the pressure compensation spring 124 rests against a distal end of the inner sleeve 118. As the inner sleeve 118 is fixed, while the pressure compensation spool 109 is axially movable within the outer sleeve 108, the pressure compensation spring 124 applies a biasing force on the pressure compensation spool 109 in the distal direction.

When no fluid is received at the inlet port 110, no fluid force is applied on the pressure compensation spool 109 in the proximal direction. In this case, the pressure compensation spring 124 biases the pressure compensation spool 109 to the axial position shown in FIG. 1, where the cross-hole 111 is blocked by the housing 106 and is thus not fluidly coupled to the bypass flow cross-holes 113A, 113B. The term "block" is used throughout herein to indicate substantially preventing fluid flow except for minimal or leakage flow of drops per minute, for example.

The inner sleeve 118 includes a respective longitudinal cylindrical cavity therein. The valve 100 includes a throttling spool 126 that is disposed, and slidably accommodated, in the longitudinal cylindrical cavity of the inner sleeve 118. The valve 100 comprises a main chamber 128 formed between the inlet port 110 and the throttling spool 126 by respective longitudinal cylindrical cavities of the pressure compensation spool 109 and the inner sleeve 118.

Further, the throttling spool 126 has a longitudinal internal channel 130 and radial cross-holes or a radial channel 132 that communicates fluid received from the inlet port 110 through the main chamber 128 to a chamber 134 defined between an exterior peripheral surface of the throttling spool 126 and interior peripheral surfaces of the housing 106 and the inner sleeve 118. Fluid in the chamber 134 is further communicated to a proximal end of the throttling spool 126 through unsealed spaces.

With this configuration, fluid received at the inlet port 110 applies a fluid force on the throttling spool 126 in the proximal direction, and is also communicated to the chamber 134 and applies a respective force on the throttling spool 126 in the distal end. This way, the throttling spool 126 is pressure-balanced with respect to fluid received at the inlet port 110.

The valve 100 further comprises a control spring 136 disposed about an exterior surface of a proximal portion of the throttling spool 126, which has a reduced diameter compared to a distal portion of the throttling spool 126. The control spring 136 has a proximal end that is secured against a spring cap 138, which is fixed, whereas a distal end of the control spring 136 rests against the distal portion of the throttling spool 126 having an enlarged diameter. The control spring 136 thus applies a biasing force on the throttling spool 126 in the distal direction. In the axial position of the throttling spool 126 shown in FIG. 1, the throttling spool 126 blocks the throttling cross-hole 120 to preclude fluid flow from the inlet port 110 to the priority port 114.

The solenoid actuator 104 can include a solenoid tube 140 configured as a cylindrical housing or body disposed within and received at a proximal end of the housing 106. A solenoid coil 142 can be disposed about an exterior surface of the solenoid tube 140. The solenoid coil 142 is retained between a proximal end of the housing 106 and a coil nut 144 having internal threads that can engage a threaded region formed on the exterior peripheral surface of the solenoid tube 140 at its proximal end.

The solenoid tube 140 further has a chamber 146 defined within a distal side of the solenoid tube 140. The solenoid tube 140 further includes a pole piece 148 composed of material of high magnetic permeability.

The solenoid tube 140 is configured to house a plunger or an armature 150 in the chamber 146. The armature 150 is slidably accommodated within the solenoid tube 140 (i.e., the armature 150 can move axially within the solenoid tube 140). The pole piece 148 can be separated from the armature 150 by an airgap 152.

The armature 150 includes a longitudinal channel 154 comprising an annular internal groove 156 formed by an interior peripheral surface of the armature 150. The annular internal groove 156 is formed as a recessed portion configured to receive an enlarged proximal end 158 of the throttling spool 126. With this configuration, the throttling spool 126 is mechanically-coupled or linked to the armature 150, such that axial motion of the armature 150 causes the throttling spool 126 to move therewith.

In an example, the valve 100 can further include a static biasing spring 160 having a distal end resting against a proximal end of the inner sleeve 118 and is thus fixed, whereas a proximal end of the static biasing spring 160 rests against the spring cap 138. In example applications where the valve 100 is vertically-oriented such that the proximal end of the valve 100 is disposed upward, whereas its distal end is pointing downward, gravity might cause the armature 150, the throttling spool 126, the spring cap 138, and the control spring 136 to drift downward. The static biasing spring 160 precludes such drifting from happening.

Particularly, the static biasing spring 160 applies a biasing force on the spring cap 138 in the proximal direction, thereby maintaining the axial position of the spring cap 138 secured against the distal end of the solenoid tube 140 and the distal end of the armature 150. This way, the armature 150 is precluded from drifting downward or in the distal direction when the valve 100 is vertically-oriented. Dynamically, when the solenoid coil 142 is energized and the armature 150 is pulled in the proximal direction as described below, the static biasing spring 160 does not affect operation of the valve 100. The static biasing spring 160 is depicted as a wave spring in FIG. 1; however, other spring types (e.g., a coil spring) can be used.

The valve 100 is configured to operate in several states based on whether an electric command signal is provided to the solenoid coil 142 to actuate the valve 100 and based on whether fluid is provided to the inlet port 110. FIG. 1 depicts the valve 100 when the solenoid coil 142 is un-energized (i.e., the valve 100 is unactuated) and when no fluid pressure is applied at the inlet port 110 (or when fluid pressure is applied at a nominal value below a threshold pressure value).

Figure 2:
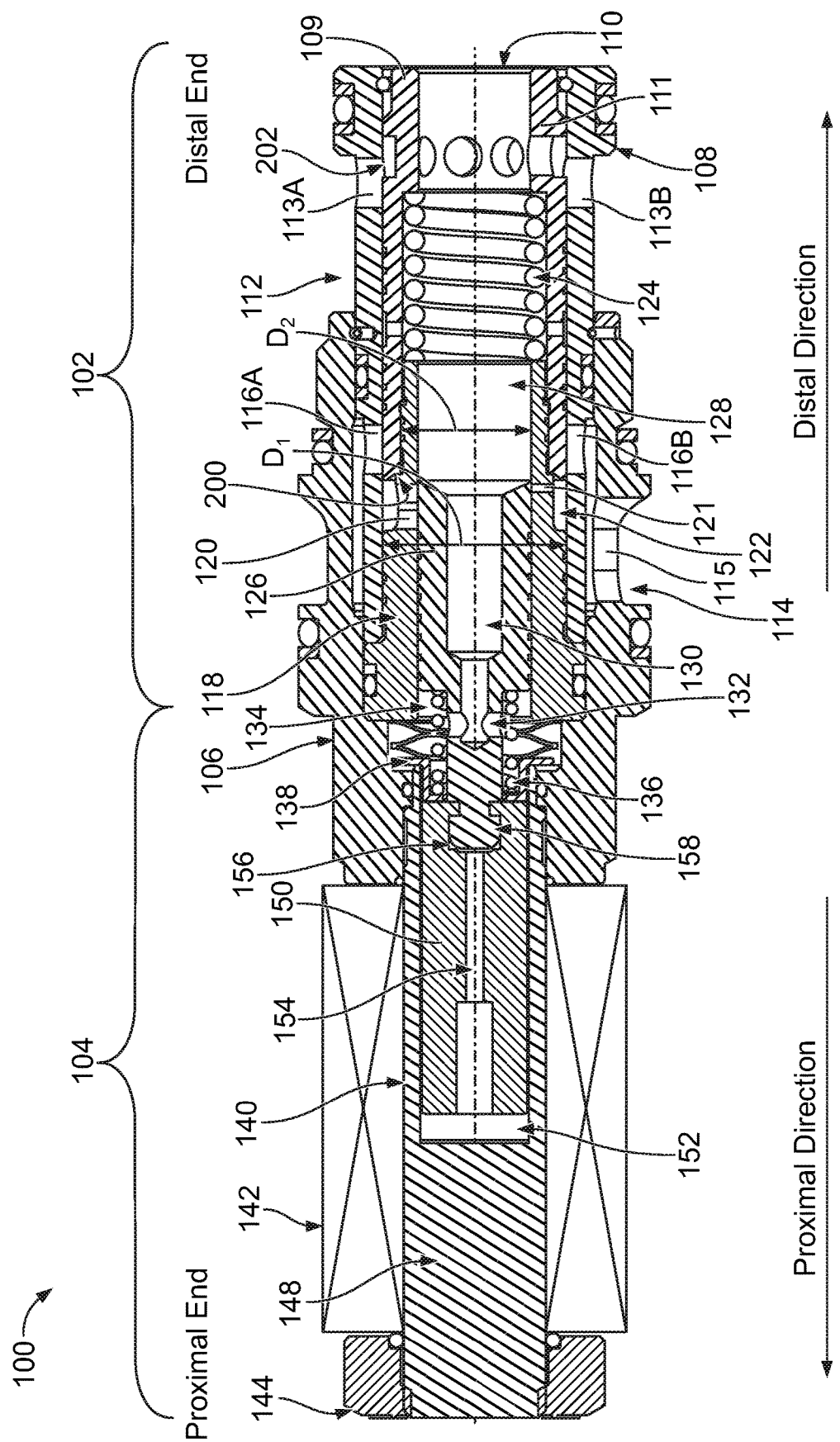
FIG. 2 illustrates a cross-sectional side view of the valve of FIG. 1 when fluid is provided to an inlet port without energizing a solenoid coil of the valve, in accordance with an example implementation.

FIG. 2 illustrates a cross-sectional side view of the valve 100 when fluid is provided to the inlet port 110 without energizing the solenoid coil 142, in accordance with an example implementation. In the state shown in FIG. 2, no priority flow is requested at the priority port 114 and therefore the solenoid coil 142 is not energized. Thus, the throttling spool 126 remains in the same axial position as in FIG. 1 where the throttling spool 126 blocks the throttling cross-hole 120, and thus blocks fluid flow to the priority port 114.

Fluid received at the inlet port 110 applies a force in the proximal direction (e.g., to the left in FIG. 2) on the pressure compensation spool 109. Defining an outer diameter of the pressure compensation spool 109 as $D_1$ (labelled in FIG. 2), a corresponding surface area $A_1$ can be determined as $A_1 = \pi D_1^2/4$. Defining an inner diameter of the pressure compensation spool 109 as $D_2$ (labelled in FIG. 2), a corresponding surface area $A_2$ can be determined as $A_2 = \pi D_2^2/4$. The pressure compensation spool 109 is configured such that fluid received at the inlet port 110 applies a fluid force thereto in the proximal direction that is equal to $F_1 = P_1(A_1 - A_2)$, where $P_1$ is pressure level of fluid at the inlet port 110. Since the throttling spool 126 blocks fluid flow through the throttling cross-hole 120, fluid received at the inlet port 110 is not communicated to pressure compensation chamber 122 and does not apply a force on the pressure compensation spool 109 in the distal direction.

Further, as described above, the pressure compensation spring 124 applies a biasing force on the pressure compensation spool 109 in the distal direction, opposite the fluid force $F_1$. When the pressure level $P_1$ reaches a pressure value that causes the fluid force $F_1$ to overcome the biasing force of the pressure compensation spring 124, the pressure compensation spool 109 can move in the proximal direction to the axial position shown in FIG. 2. The pressure compensation spool 109 can move in the proximal direction until its proximal end reaches a shoulder 200 formed by an exterior peripheral surface of the inner sleeve 118.

In this axial position of the pressure compensation spool 109, the bypass flow cross-holes 113A, 113B are not blocked by the pressure compensation spool 109. Rather, the bypass flow cross-holes 113A, 113B are exposed to and become fluidly coupled to the cross-hole(s) 111 of the pressure compensation spool 109 via a bypass flow area 202. As such, fluid provided to the inlet port 110 flows through the main chamber 128 (through the pressure compensation spool 109), through the cross-hole(s) 111 of the pressure compensation spool 109, then through the bypass flow area 202 and the bypass flow cross-holes 113A, 113B to the bypass port 112.

Thus, when no priority flow is requested at the priority port 114, i.e., when no command signal is provided to energize the solenoid coil 142, the throttling spool 126 blocks fluid flow to the throttling cross-hole 120, and all the fluid provided to the inlet port 110 flows to the bypass port 112. Energizing the solenoid coil 142, however, can cause a portion of fluid received at the inlet port 110 to flow in an amount that is proportional to the magnitude of the command signal to the solenoid coil 142 to the priority port 114, while excess or remaining fluid can flow to the bypass port 112 as described next.

Figure 3:
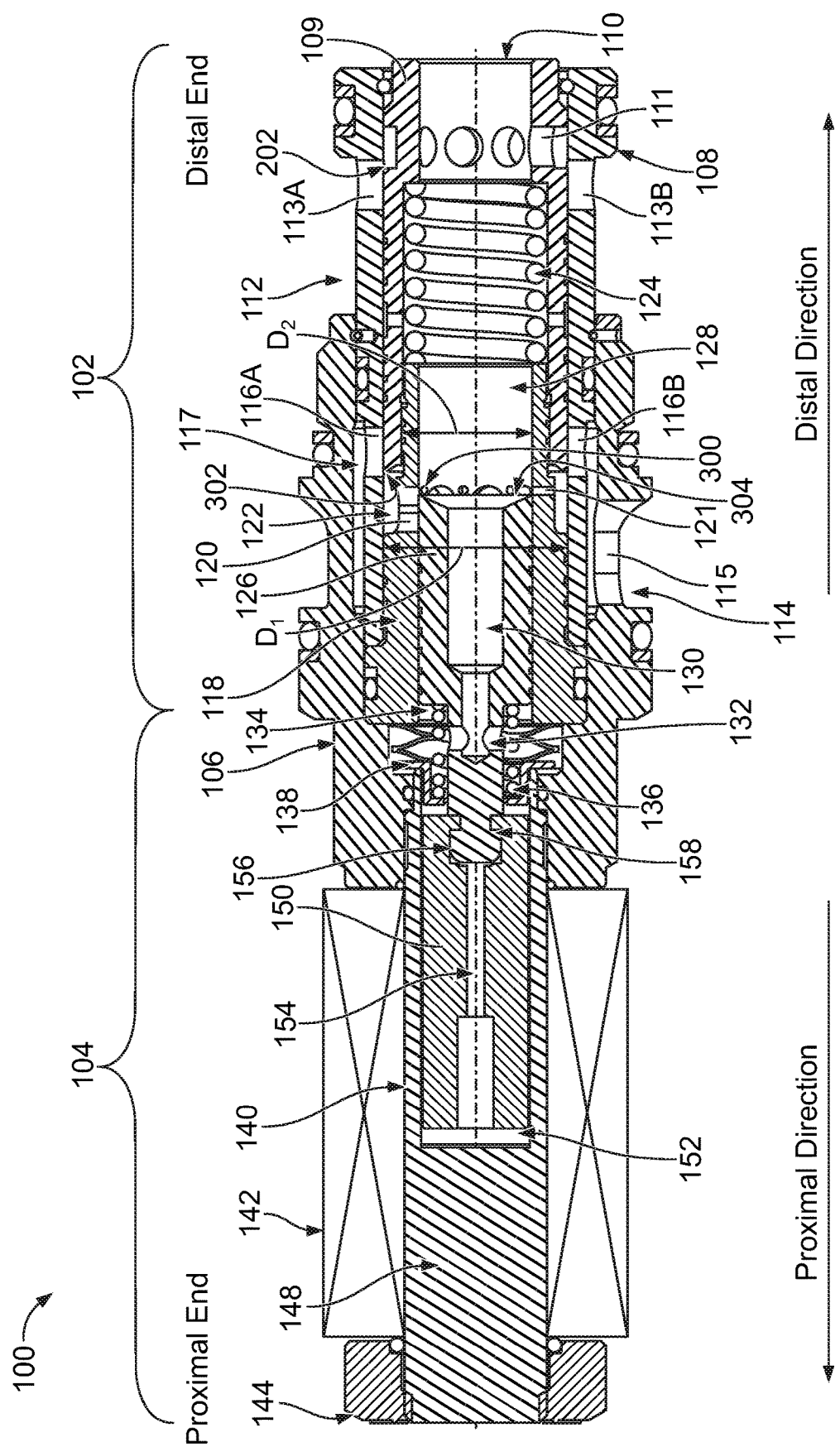
FIG. 3 illustrates a cross-sectional side view of the valve of FIG. 1 with a solenoid coil being energized to provide priority flow, in accordance with another example implementation.

FIG. 3 illustrates a cross-sectional side view of the valve 100 with the solenoid coil 142 being energized (i.e., when the valve 100 is actuated) to provide priority flow, in accordance with an example implementation. When an electrical current is provided through the windings of the solenoid coil 142, a magnetic field is generated. The pole piece 148 directs the magnetic field through the airgap 152 toward the armature 150, which is movable and is attracted toward the pole piece 148. In other words, when an electrical current is applied to the solenoid coil 142, the generated magnetic field forms a north and south pole in the pole piece 148 and the armature 150. Thus, a solenoid force is generated to attract the pole piece 148 and the armature 150 toward each other. The pole piece 148 is fixed, whereas the armature 150 is movable, and therefore the solenoid force is a pulling force that tends to pull the armature 150 in the proximal direction (to the left in FIG. 3). The solenoid force is proportional to a magnitude of the electrical command or signal (e.g., magnitude of electrical current or voltage applied to the solenoid coil 142).

The throttling spool 126 is coupled to the armature 150 as described above due to engagement of the enlarged proximal end 158 of the throttling spool 126 with the armature 150 at the annular internal groove 156 of the armature 150. Thus, when the solenoid force applied to the armature 150 overcomes the biasing force of the control spring 136, the armature 150 and the throttling spool 126 can move axially in the proximal direction (e.g., to the left in FIG. 3).

Particularly, the armature 150 and the throttling spool 126 can move until a force equilibrium is reached between the solenoid force and the biasing force of the control spring 136. Thus, the extent of axial movement of the throttling spool 126 is proportional to the magnitude of the electrical command signal to the solenoid coil 142. The higher the magnitude of the electrical command, the larger the axial movement of the armature 150 and the throttling spool 126, and vice versa.

As the throttling spool 126 moves in the proximal direction past edges of the throttling cross-hole(s) 120, a throttling variable orifice or throttling flow area 300 is formed between a distal end face 304 of the throttling spool 126 and distal edges of the throttling cross-hole(s) 120, thereby allowing fluid to flow from the main chamber 128 through the throttling cross-hole(s) 120 to the pressure compensation chamber 122. Defining pressure level of fluid in the pressure compensation chamber 122 as $P_{COMP}$, the pressure compensation spool 109 is configured such that pressurized fluid in the pressure compensation chamber 122 applies a force thereto in the distal direction that is equal to $F_{COMP} = P_{COMP}(A_1 - A_2)$.

As mentioned above, fluid at the inlet port 110 applies the fluid force $F_1 = P_1(A_1 - A_2)$ to the pressure compensation spool 109 in the proximal direction. Further, the pressure compensation spring 124 applies a biasing force $F_{COMP\_SP}$ on the pressure compensation spool 109 in the distal direction. Thus, a force equilibrium equation of forces acting on the pressure compensation spool 109 can be stated as follows:

$$F_{COMP\_SP} + F_{COMP} = F_1 \quad (1)$$

Initially, when the throttling flow area 300 has just begun to form, the pressure compensation spool 109 remains in the position shown in FIG. 2 where it blocks the pressure compensation cross-holes 116A, 116B, and therefore fluid does not flow from the pressure compensation chamber 122 to the priority port 114. As such, fluid in the pressure compensation chamber 122 $P_{COMP}$ initially has the same pressure level as the pressure level $P_1$ of fluid at the inlet port 110. In this case, when $P_{COMP}$ is initially the same as $P_1$, the fluid force $F_{COMP}$ balances or is equal to $F_1$.

Thus, based on equation (1) above, the force $F_{COMP\_SP}$ acts on the pressure compensation spool 109 to move it in the distal direction. As the proximal end of the pressure compensation spool 109 moves in the distal direction past edges of the pressure compensation cross-holes 116A, 116B, a pressure compensation variable orifice or pressure compensation flow area 302 is formed as shown in FIG. 3 between a proximal end of the pressure compensation spool 109 and proximal edges of the pressure compensation cross-holes 116A, 116B. As a result, fluid flows from the pressure compensation chamber 122 through the pressure compensation flow area 302 and the pressure compensation cross-holes 116A, 116B to the annular chamber 117, then through the priority flow cross-hole 115 to the priority port 114.

As a result of fluid flow through the throttling flow area 300, a pressure drop occurs between pressure level in the main chamber 128 (i.e., pressure level $P_1$) and the pressure level $P_{COMP}$ in the pressure compensation chamber 122. Using the Bernoulli orifice equation, the fluid flow rate Q through the throttling flow area 300 can be determined as:

$$Q = K_1 \sqrt{(P_1 - P_{COMP})} \quad (2)$$

where $K_1$ is a variable that is proportional to the size of the throttling flow area 300, which is determined based on the magnitude of the command signal to the solenoid coil 142 that determines the axial position of the throttling spool 126.

The fluid flowing across the throttling flow area 300 also flows through the pressure compensation flow area 302 at the same flow rate Q. Thus, the flow rate Q can also be expressed as a function of pressure drop across the pressure compensation flow area 302 as follows:

$$Q = K_2 \sqrt{(P_{COMP} - P_3)} \quad (3)$$

where P3 is the pressure level at the priority port 114 and where $K_2$ is a variable that is proportional to the size of the pressure compensation flow area 302, which is determined based on the axial position of the pressure compensation spool 109.

The pressure drop across the throttling flow area 300 causes the pressure level $P_{COMP}$ to become less than $P_1$, and therefore the force $F_1$ becomes larger than $F_{COMP}$. Based on equation (1), the pressure compensation spool 109 can responsively move axially to a particular axial position where an equilibrium is achieved between the three forces $F_{COMP\_SP}$, $F_{COMP}$, and $F_1$.

Particularly, the pressure level $P_{COMP}$ is adjusted as the pressure compensation spool 109 moves so as to maintain the force equilibrium. If the pressure compensation spool 109 moves to the right, a size of the pressure compensation flow area 302 increases and $K_2$ increases. As a result, pressure drop across the pressure compensation flow area 302 is reduced as fluid flows therethrough. Thus, based on equation (3), $P_{COMP}$ decreases for a given flow rate Q across the pressure compensation flow area 302 and a given pressure level $P_3$ at the priority port 114.

Conversely, if the pressure compensation spool 109 moves to the left, a size of the pressure compensation flow area 302 decreases and $K_2$ decreases. As a result, pressure drop across the pressure compensation flow area 302 increases as fluid flows therethrough. Thus, based on equation (3), $P_{COMP}$ increases for a given flow rate across the pressure compensation flow area 302 and a given pressure level $P_3$ at the priority port 114.

Equation (1) can be expressed as follows:

$$F_{COMP\_SP} = F_1 - F_{COMP} = P_1(A_1 - A_2) - P_{COMP}(A_1 - A_2) => F_{COMP\_SP} = (P_1 - P_{COMP})(A_1 - A_2) \quad (4)$$

From equation (4), the pressure drop $(P_1 - P_{COMP})$ can be expressed as a function of the biasing force $F_{COMP\_SP}$ of the pressure compensation spring 124 and the area difference $(A_1 - A_2)$ as follows:

$$P_1 - P_{COMP} = \frac{F_{COMP\_SP}}{(A_1 - A_2)} \quad (5)$$

Equation (5) indicates that the pressure drop $(P_1 - P_{COMP})$ across the throttling flow area 300 can be maintained substantially constant based on parameters of the pressure compensation spring 124 (e.g., spring rate, preload, etc.) and the diameters $D_1$, $D_2$, which determine the areas $A_1$, $A_2$, respectively. For example, the parameters of the pressure compensation spring 124 and the diameters $D_1$, $D_2$, can be selected such that the pressure drop $(P_1 - P_{COMP})$ is equal to 200 psi, and the pressure compensation spool 109 moves axially to a position that achieves such pressure drop regardless of the pressure levels $P_1$ and $P_3$.

As an example for illustration, the pressure level $P_1$ at the inlet port 110 can be 3000 psi, and thus the pressure compensation spool 109 moves axially to determine a size of the pressure compensation flow area 302 that causes the pressure level $P_{COMP}$ in the pressure compensation chamber 122 to be 2800 psi to maintain a pressure drop of 200 psi across the throttling flow area 300. If pressure level $P_1$ at the inlet port 110 increases from 3000 psi to 5000 psi, the pressure compensation spool 109 responsively moves axially in the proximal direction (e.g., to the left in FIG. 3) to reduce a size of the pressure compensation flow area 302, thereby increasing the pressure drop thereacross and increasing the pressure level $P_{COMP}$ in the pressure compensation chamber 122 to 4800 psi to maintain the pressure drop of 200 psi across the throttling flow area 300.

Conversely, if the pressure level $P_1$ at the inlet port 110 decreases from 3000 psi to 2000 psi, the pressure compensation spool 109 responsively moves axially in the distal direction (e.g., to the right in FIG. 3) to increase the size of the pressure compensation flow area 302, thereby decreasing the pressure drop thereacross and decreasing the pressure level $P_{COMP}$ in the pressure compensation chamber 122 to 1800 psi to maintain the pressure drop of 200 psi across the throttling flow area 300.

Referring back to equation (1), if the pressure drop $(P_1 - P_{COMP})$ across the throttling flow area 300 is maintained substantially constant, the flow rate Q becomes proportional to the variable $K_1$, which is proportional to magnitude of the command signal to the electric coil 142 that determines the axial position of the throttling spool 126 and the size of the throttling flow area 300. As such, the valve 100 is pressure-compensated such that the proportionality between the command signal to the electric coil 142 and the flow rate Q from the inlet port 110 to the priority port 114 is maintained regardless of changes in the pressure level $P_1$ at the inlet port 110 or changes in the pressure level $P_3$ at the priority port 114.

The fluid flow rate Q provided from the inlet port 110 through the throttling flow area 300 and the pressure compensation flow are 302 can be referred to as the requested amount of flow rate or the priority flow rate that is requested by the electric command signal provided to the solenoid coil 142. The priority flow rate Q is sufficient to maintain the pressure drop ($P_1-P_{COMP}$) across the throttling flow area 300 substantially constant. Excess flow rate can be provided from the inlet port 110 through the bypass flow area 202 to the bypass port 112. This way, fluid is divided or apportioned between the priority port 114 and the bypass port 112.

Notably, flow forces applied to the throttling spool 126 are reduced compared to conventional valve configurations. Particularly, the fluid flowing from the inlet port 110 flows through the throttling flow area 300, which is formed between the distal end face 304 of the throttling spool 126 and edges of the throttling cross-hole(s) 120. This configuration contrasts with conventional valves where fluid flow through an internal chamber of a throttling spool then through cross-holes formed in the throttling spool.

The configuration of the valve 100 can reduce the flow forces acting on the throttling spool substantially. For example, while a conventional valve can generate a 5 lbs flow force, the valve 100 can generate about a 1.8 lbs flow force, which amounts to 36% of the flow force of a conventional valve. Such reduction in flow force may enable the valve 100 to use a smaller solenoid coil to generate a smaller solenoid force compared to conventional valves. For example, while a conventional valve might have a solenoid actuator capable of generating a solenoid force of up to about 30 lbs to overcome the larger flow force, the solenoid coil 142 of the valve 100 can be comparatively smaller and the solenoid actuator 104 can be configured to generate a solenoid force of up to about 10 lbs. Thus, the valve 100 can use a smaller and cheaper solenoid coil compared to conventional valves.

Although the valve 100 is configured as a three-port valve, a similar valve configuration can be used for a two-port valve implementation. Such a two-port valve might not include a bypass port (e.g., the bypass port 112). Rather, the two-port valve can be configured to have an inlet port (e.g., the inlet port 110) and an outlet port (e.g., the priority port 114), where fluid flowing from the inlet port to the outlet port is pressure-compensated due to interaction and relative axial motion between the throttling spool 126 and the pressure compensation spool 109 as described above with respect to the valve 100. A sufficient amount of fluid is allowed to flow from the inlet port to the outlet port to achieve pressure compensation, and no excess flow is generated at the inlet port.

Thus, the valve 100 can be used in various hydraulic systems. For example, a hydraulic system can have a priority or primary hydraulic circuit (e.g., a priority actuator such as steering actuator of a vehicle) and a secondary circuit that requires at least a particular amount of flow to operate. The valve 100 can thus be used to provide at least the particular amount of flow to the secondary circuit, while providing priority flow proportionally to the primary circuit.

Figure 4:
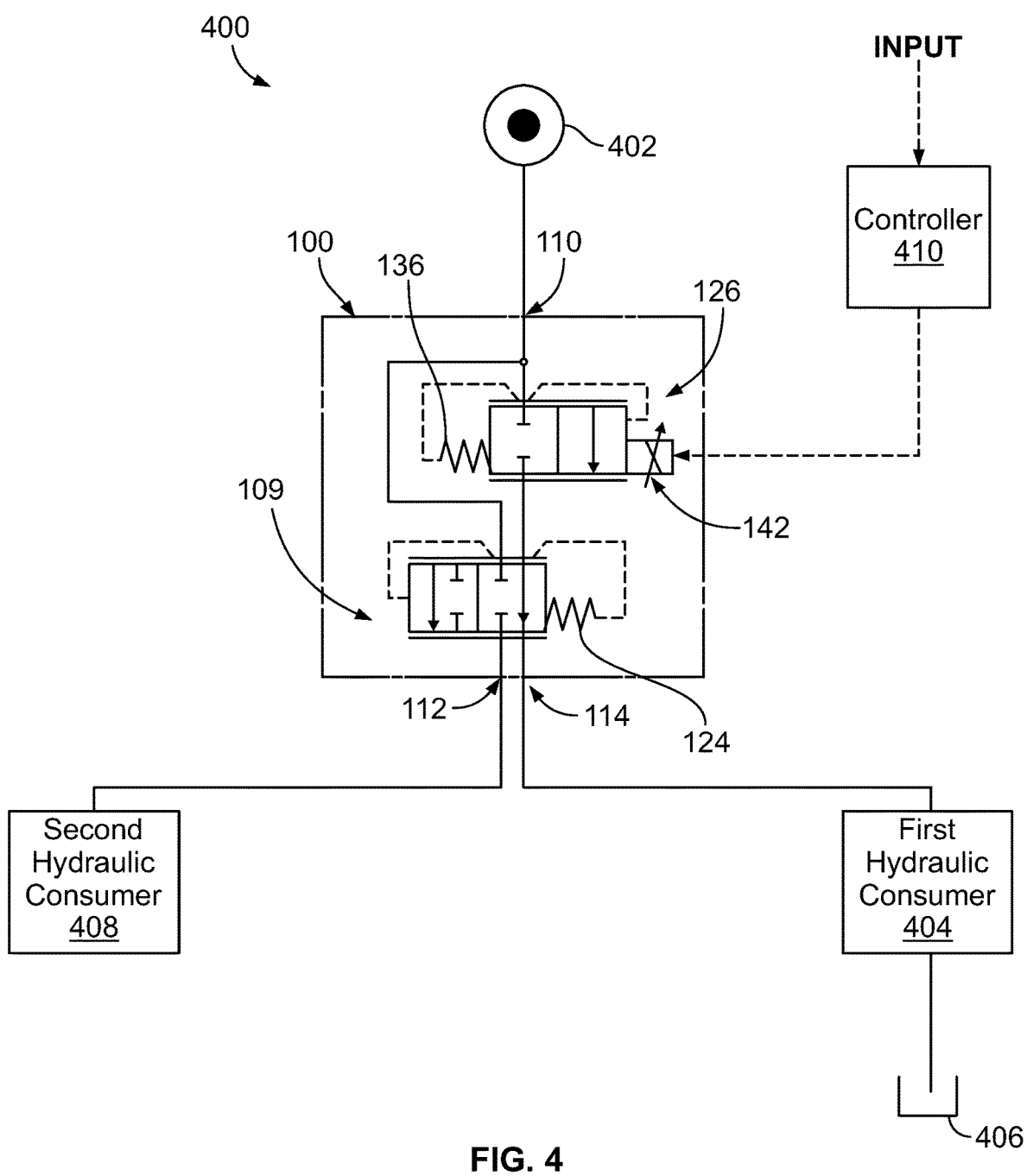
FIG. 4 illustrates a hydraulic system, in accordance with an example implementation.

FIG. 4 illustrates a hydraulic system 400, in accordance with an example implementation. The hydraulic system 400 depicted in FIG. 4 shows the valve 100 represented symbolically.

The hydraulic system 400 includes a source 402 of fluid. The source 402 of fluid can, for example, be a pump configured to provide fluid to the inlet port 110 of the valves 100. Such pump can be a fixed displacement pump, a variable displacement pump, or a load-sensing variable displacement pump, as examples. Additionally or alternatively, the source 402 of fluid can be an accumulator or another hydraulic system in fluid communication with the hydraulic system 400.

The hydraulic system 400 can include a primary or first hydraulic consumer 404 that is fluidly coupled to the priority port 114 of the valve 100. The first hydraulic consumer 404 can, for example, include a primary or priority hydraulic circuit comprising multiple components. In an example, the first hydraulic consumer 404 can be an actuator, such as a hydraulic cylinder or hydraulic motor, configured to receive pressure-compensated fluid flow from the valve 100.

In an example, the first hydraulic consumer 404 can be fluidly coupled to a reservoir 406 of fluid. The reservoir 406 can store fluid at a low pressure (e.g., 0-70 psi) and is configured to receive return or exhaust fluid from the first hydraulic consumer 404. In examples, the source 402 of fluid can be a pump configured to receive fluid from the reservoir 406, pressurize the fluid, then provide pressurized fluid to the inlet port 110 of the valve 100.

The hydraulic system 400 can further include a second hydraulic consumer 408 that is fluidly coupled to the bypass port 112 of the valve 100. The second hydraulic consumer 408 can, for example, include a hydraulic circuit that requires at least a particular amount of fluid flow to operate but can consume more fluid flow. In an example, the second hydraulic consumer 408 can be or include the reservoir 406.

The hydraulic system 400 can further include a controller 410. The controller 410 can include one or more processors or microprocessors and may include data storage (e.g., memory, transitory computer-readable medium, non-transitory computer-readable medium, etc.). The data storage may have stored thereon instructions that, when executed by the one or more processors of the controller 410, cause the controller 410 to perform operations described herein. Signal lines to and from the controller 410 are depicted as dashed lines in FIG. 4.

The controller 410 can receive input or input information comprising sensor information via signals from various sensors or input devices in the hydraulic system 400 or other systems and in response provide electrical signals to various components of the hydraulic system 400. For example, the controller 410 can receive a command or an input signal (e.g., from a joystick of a machine) to provide pressure-compensated fluid flow to the first hydraulic consumer 404 at a flow rate that is proportional to the command. In response, the controller 410 can provide a signal to the valve 100 to energize the solenoid coil 142, move the throttling spool 126, and allow fluid to flow from the inlet port 110 to the priority port 114 (through the throttling flow area 300 and the pressure compensation flow area 302 as described above) then to the first hydraulic consumer 404. Excess flow not requested by the first hydraulic consumer 404 is provided to the bypass port 112, then to the second hydraulic consumer 408.

As an example for illustration, the source 402 can be configured to provide fluid at flow rate of 20 gallons per minute (GPM) to the valve 100. The second hydraulic consumer 408 can be configured to receive at least 10 GPM to operate. On the other hand, the first hydraulic consumer 404 can include a priority actuator configured to receive between 0 and 10 GPM in proportion to a magnitude of a command signal provided as an input (e.g., from a joystick) to the controller 410.

If no command signal is provided to the controller 410, the valve 100 operates in the state described above with respect to FIG. 2, where all fluid provided to the inlet port 110 at a rate of 20 GPM flows to bypass port 112, then to the second hydraulic consumer 408. If a command signal is provided to the controller 410, the controller 410 responsively sends a proportional electric signal to the solenoid coil 142 of the valve 100 to provide a proportional amount of pressure-compensated fluid at a flow rate between 0 GPM and 10 GPM to the priority port 114, then to the first hydraulic consumer 404. The remaining fluid flow rate of the 20 GPM is provided to the second hydraulic consumer 408. As such, if a maximum command signal is provided to the controller 410 requesting the full 10 GPM to the first hydraulic consumer 404, the remaining 10 GPM are provided to the second hydraulic consumer 408, which is the minimum amount required to operate the second hydraulic consumer 408 as mentioned above.

Figure 5:
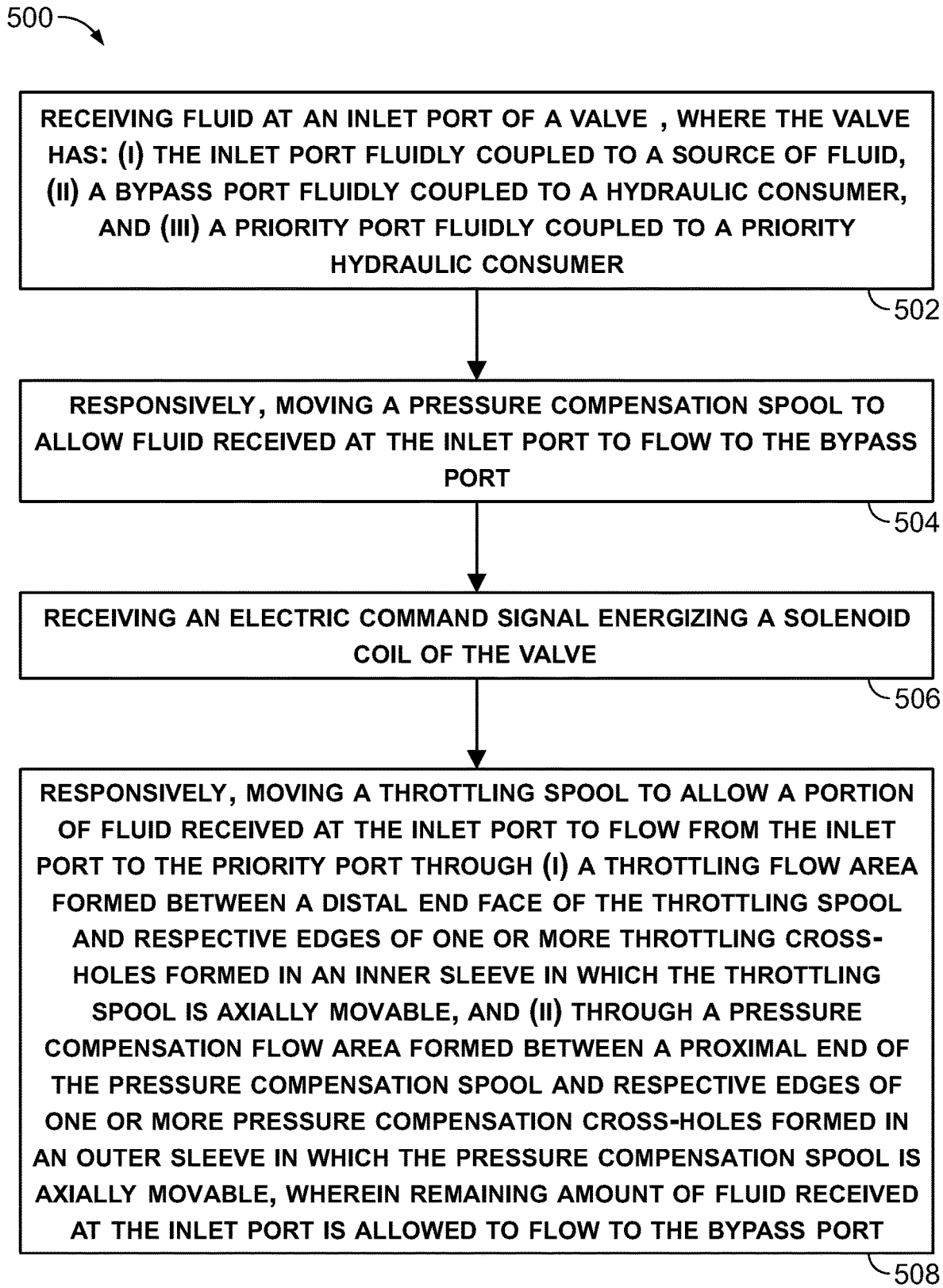
FIG. 5 is a flowchart of a method for operating a valve, in accordance with an example implementation.

FIG. 5 is a flowchart of a method 500 for operating a valve, in accordance with an example implementation. The method 500 shown in FIG. 5 presents an example of a method that can be used with the valve 100 shown throughout the Figures, for example. The method 500 may include one or more operations, functions, or actions as illustrated by one or more of blocks 502-508. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes receiving fluid at the inlet port 110 of the valve 100, where the valve 100 has: (i) the inlet port 110 fluidly coupled to the source 402 of fluid, (ii) the bypass port 112 fluidly coupled to a hydraulic consumer (e.g., the second hydraulic consumer 408), and (iii) the priority port 114 fluidly coupled to a priority hydraulic consumer (e.g., the first hydraulic consumer 404).

At block 504, the method 500 includes, responsively, moving the pressure compensation spool 109 to allow fluid received at the inlet port 110 to flow to the bypass port 112.

At block 506, the method 500 includes receiving an electric command signal energizing the solenoid coil 142 of the valve 100.

At block 508, the method 500 includes, responsively, moving the throttling spool 126 to allow a portion of fluid received at the inlet port 110 to flow from the inlet port 110 to the priority port 114 through (i) the throttling flow area 300 formed between the distal end face 304 of the throttling spool 126 and respective edges of one or more throttling cross-holes (e.g., the throttling cross-hole 120) formed in the inner sleeve 118 in which the throttling spool 126 is axially movable, and (ii) through the pressure compensation flow area 302 formed between a proximal end of the pressure compensation spool 109 and respective edges of one or more pressure compensation cross-holes (e.g., the pressure compensation cross-holes 116A, 116B) formed in the outer sleeve 108 in which the pressure compensation spool 109 is axially movable, wherein remaining amount of fluid received at the inlet port 110 is allowed to flow to the bypass port 112.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
 a pressure compensation spool configured to be subjected to a first fluid force of fluid received at an inlet port of the valve acting on the pressure compensation spool in a proximal direction to move the pressure compensation spool in the proximal direction and allow fluid to flow from the inlet port to a bypass port of the valve;

a sleeve disposed partially within the pressure compensation spool, wherein the sleeve has a cavity therein and has at least one throttling cross-hole;

a throttling spool disposed in the cavity of the sleeve and configured to be axially movable therein, wherein the throttling spool blocks the at least one throttling cross-hole when the valve is unactuated; and a pressure compensation chamber, wherein when the valve is actuated, the throttling spool moves in the proximal direction to form a throttling flow area between a distal end face of the throttling spool and an edge of the at least one throttling cross-hole, allowing fluid flow from the inlet port to the pressure compensation chamber through the throttling flow area, thereby causing a second fluid force to be applied on the pressure compensation spool in a distal direction by fluid in the pressure compensation chamber, such that the pressure compensation spool moves in the distal direction to form a pressure compensation flow area that allows fluid flow therethrough from the pressure compensation chamber to a priority port of the valve, thereby allowing fluid received at the inlet port to be apportioned between the bypass port and the priority port.

2. The valve of claim 1, wherein the sleeve is an inner sleeve and wherein the cavity is a first cavity, the valve further comprising:

an outer sleeve having a second cavity, wherein the pressure compensation spool is disposed in the second cavity of the outer sleeve and configured to be axially movable therein.

3. The valve of claim 2, wherein the outer sleeve has at least one pressure compensation cross-hole, and wherein movement of the pressure compensation spool in the distal direction causes the pressure compensation flow area to form between a proximal end of the pressure compensation spool and a respective edge of the pressure compensation cross-hole.

4. The valve of claim 2, wherein the pressure compensation chamber is formed between an exterior peripheral surface of the inner sleeve and an interior peripheral surface of the outer sleeve.

5. The valve of claim 2, further comprising:

a housing having a third cavity, wherein the outer sleeve is disposed in the third cavity of the housing, wherein: (i) the inlet port is formed at a distal end of the pressure compensation spool and the outer sleeve and is configured to be fluidly coupled to a source of fluid, (ii) the priority port is formed in the housing and is configured to be fluidly coupled to a first hydraulic consumer, and (iii) the bypass port is formed in the outer sleeve and is configured to be fluidly coupled to a second hydraulic consumer.

6. The valve of claim 1, further comprising:

a pressure compensation spring disposed within the pressure compensation spool and configured to apply a biasing force on the pressure compensation spool in the distal direction, such that the pressure compensation spool moves to a particular axial position based on a force equilibrium between the first fluid force, the second fluid force, and the biasing force of the pressure compensation spring.

7. The valve of claim 1, further comprising:

a solenoid actuator having an armature coupled to the throttling spool such that axial motion of the armature causes the throttling spool to move axially and form the throttling flow area.

8. The valve of claim 7, wherein the solenoid actuator further comprises:

a solenoid coil; and a pole piece, wherein:

when the valve is unactuated, the solenoid coil is un-energized and the throttling spool blocks the at least one throttling cross-hole, and when the valve is actuated, the solenoid coil is energized, causing a solenoid force to be applied to the armature and the throttling spool coupled thereto, thereby causing the armature and the throttling spool to move axially in the proximal direction toward the pole piece and form the throttling flow area.

9. The valve of claim 8, further comprising:

a control spring configured to apply a biasing force on the throttling spool in the distal direction, wherein when the solenoid coil is energized, the armature and the throttling spool to move to a particular axial position based on a force equilibrium between the solenoid force and the biasing force of the control spring.

10. The valve of claim 7, further comprising:

a static biasing spring configured to apply a force on the armature in the proximal direction to preclude the armature from drifting in the distal direction when the valve is vertically-oriented.

11. A hydraulic system comprising:

a source of fluid;

a first hydraulic consumer;

a second hydraulic consumer; and a valve comprising: (i) an inlet port fluidly coupled to the source of fluid, (ii) a priority port fluidly coupled to the first hydraulic consumer, and (iii) a bypass port fluidly coupled to the second hydraulic consumer, and wherein the valve further comprises:

a pressure compensation spool configured to be subjected to a first fluid force of fluid received at the inlet port acting on the pressure compensation spool in a proximal direction to move the pressure compensation spool in the proximal direction and allow fluid to flow from the inlet port to the bypass port, a sleeve disposed partially within the pressure compensation spool, wherein the sleeve has a cavity therein and has at least one throttling cross-hole, a throttling spool disposed in the cavity of the sleeve and configured to be axially movable therein, wherein the throttling spool blocks the at least one throttling cross-hole when the valve is unactuated, and a pressure compensation chamber, wherein when the valve is actuated, the throttling spool moves in the proximal direction to form a throttling flow area between a distal end face of the throttling spool and an edge of the at least one throttling cross-hole, allowing fluid flow from the inlet port to the pressure compensation chamber through the throttling flow area, thereby causing a second fluid force to be applied on the pressure compensation spool in a distal direction by fluid in the pressure compensation chamber, such that the pressure compensation spool moves in the distal direction to form a pressure compensation flow area that allows fluid flow therethrough from pressure compensation chamber to the priority port of the valve, thereby allowing fluid received at the inlet port to be apportioned between the first hydraulic consumer and the second hydraulic consumer.

12. The hydraulic system of claim 11, wherein the sleeve is an inner sleeve and wherein the cavity is a first cavity, the valve further comprising:
an outer sleeve having a second cavity, wherein the pressure compensation spool is disposed in the second cavity of the outer sleeve and configured to be axially movable therein, wherein the outer sleeve has at least one pressure compensation cross-hole, and wherein movement of the pressure compensation spool in the distal direction causes the pressure compensation flow area to form between a proximal end of the pressure compensation spool and a respective edge of the pressure compensation cross-hole, and wherein the pressure compensation chamber is formed between an exterior peripheral surface of the inner sleeve and an interior peripheral surface of the outer sleeve.

13. The hydraulic system of claim 11, wherein the valve further comprises:
a pressure compensation spring disposed within the pressure compensation spool and configured to apply a biasing force on the pressure compensation spool in the distal direction, such that the pressure compensation spool moves to a particular axial position based on a force equilibrium between the first fluid force, the second fluid force, and the biasing force of the pressure compensation spring.

14. The hydraulic system of claim 11, wherein the valve further comprises a solenoid actuator, wherein the solenoid actuator comprises:
a solenoid tube having a chamber and a pole piece
an armature disposed in the chamber of the solenoid tube and coupled to the throttling spool such that axial motion of the armature causes the throttling spool to move axially and form the throttling flow area; and
a solenoid coil, wherein: (i) when the valve is unactuated, the solenoid coil is un-energized and the throttling spool blocks the at least one throttling cross-hole, and (ii) when the valve is actuated, the solenoid coil is energized, causing a solenoid force to be applied to the armature and the throttling spool coupled thereto, thereby causing the armature and the throttling spool to move axially in the proximal direction toward the pole piece and form the throttling flow area.

15. The hydraulic system of claim 14,
a control spring configured to apply a biasing force on the throttling spool in the distal direction, wherein when the solenoid coil is energized, the armature and the throttling spool move to a particular axial position based on a force equilibrium between the solenoid force and the biasing force of the control spring.

16. The hydraulic system of claim 14, further comprising:
a controller configured to receive an input signal indicative of a requested amount of flow rate for the first hydraulic consumer, and responsively send a command signal to the solenoid coil to provide fluid at a flow rate proportional to the command signal and the input signal.

17. A valve comprising:
an outer sleeve having a first cavity therein;
a pressure compensation spool disposed in the first cavity of the outer sleeve and configured to be axially movable therein, wherein the pressure compensation spool is configured to be subjected to a first fluid force of fluid received at an inlet port of the valve acting on the pressure compensation spool in a proximal direction;
an inner sleeve disposed partially within the pressure compensation spool, wherein the inner sleeve has a second cavity therein and has at least one throttling cross-hole;
a throttling spool disposed in the second cavity of the inner sleeve and configured to be axially movable therein, wherein the throttling spool blocks the at least one throttling cross-hole when the valve is unactuated; and
a pressure compensation chamber formed between the inner sleeve and the outer sleeve, wherein when the valve is actuated, the throttling spool moves in the proximal direction to form a throttling flow area between a distal end face of the throttling spool and an edge of the at least one throttling cross-hole, allowing fluid flow from the inlet port to the pressure compensation chamber through the throttling flow area, thereby causing a second fluid force to be applied on the pressure compensation spool in a distal direction by fluid in the pressure compensation chamber, such that the pressure compensation spool moves in the distal direction to form a pressure compensation flow area that allows fluid flow therethrough from the pressure compensation chamber to an outlet port of the valve, thereby allowing fluid received at the inlet port to flow to the outlet port.

18. The valve of claim 17, wherein the outer sleeve has at least one pressure compensation cross-hole, and wherein movement of the pressure compensation spool in the distal direction causes the pressure compensation flow area to form between a proximal end of the pressure compensation spool and a respective edge of the pressure compensation cross-hole.

19. The valve of claim 17, further comprising:
a housing having a third cavity, wherein the outer sleeve is disposed in the third cavity of the housing, wherein: (i) the inlet port is formed at a distal end of the pressure compensation spool and the outer sleeve and is configured to be fluidly coupled to a source of fluid, and (ii) the outlet port is formed in the housing and is configured to be fluidly coupled to a hydraulic consumer.

20. The valve of claim 17, further comprising a solenoid actuator, wherein the solenoid actuator comprises:
a solenoid tube having a chamber and a pole piece
an armature disposed in the chamber of the solenoid tube and coupled to the throttling spool such that axial motion of the armature causes the throttling spool to move axially and form the throttling flow area; and
a solenoid coil, wherein: (i) when the valve is unactuated, the solenoid coil is un-energized and the throttling spool blocks the at least one throttling cross-hole, and (ii) when the valve is actuated, the solenoid coil is energized, causing a solenoid force to be applied to the armature and the throttling spool coupled thereto, thereby causing the armature and the throttling spool to move axially in the proximal direction toward the pole piece and form the throttling flow area.

* * * * *